United States Patent [19]
Austin et al.

[11] Patent Number: 6,074,779
[45] Date of Patent: Jun. 13, 2000

[54] BATTERY CELL HOUSING

[75] Inventors: Michael M. Austin, Lilburn; Robert E. Gray, Conyers, both of Ga.

[73] Assignee: Motorola, Inc., Schaumburg, Ill.

[21] Appl. No.: 09/062,758

[22] Filed: Apr. 20, 1998

[51] Int. Cl.[7] .............................. H01M 2/10; H01M 6/42
[52] U.S. Cl. .............................. 429/100; 429/97; 429/99; 429/151
[58] Field of Search ..................... 429/121, 123, 429/151, 159, 176, 163, 164, 166, 97, 168, 99, 100

[56] References Cited

U.S. PATENT DOCUMENTS

| | | | |
|---|---|---|---|
| 4,714,439 | 12/1987 | Marabotto et al. | 429/121 X |
| 5,770,328 | 6/1998 | Friedli et al. | 429/96 |

OTHER PUBLICATIONS

Search Report from Nevac dated Apr. 2, 1998.

*Primary Examiner*—Maria Nuzzolillo
*Assistant Examiner*—Tracy Dove
*Attorney, Agent, or Firm*—Felipe J. Farley; Philip Burrus

[57] ABSTRACT

Described is a battery cell housing comprising a battery cell compartment and a latching compartment separated by an inner wall, where the battery housing is made of metal formed by combination extrusion or dual impact extrusion. This permits battery compartment wall to be thin, so that the maximum size battery cell may be inserted into it, and the latching compartment wall to be thic,k so it can be securely fastened to an electronic device. The inner wall provides an impenetrable barrier to moisture migrating from the latching compartment to the battery compartment.

6 Claims, 2 Drawing Sheets

BATTERY CELL HOUSING

TECHNICAL FIELD

This invention relates in general to the field of electronic devices, and more particularly in the field of battery housings for electronic devices.

BACKGROUND OF THE INVENTION

As electronic devices have become smaller and more portable, customers have come to expect ever-greater portability and reliability. Customers have come to expect that their electronic device can withstand any number of physical stresses including rain, vibration, and hard impact. They also want the power source for the device to be equally rugged, and to not have to concern themselves with the durability of the power source. Of course, to satisfy the consumer demand for longer-lasting power sources, advanced chemistries must be employed in the power source, typically a battery. Advanced battery chemistries are often quite sensitive to environmental conditions. Such batteries require special housings within electronic devices.

Therefore, there is a need for an improved battery housing.

DETAILED DESCRIPTION OF THE PREFERRED EMBODIMENT

Figure 1:
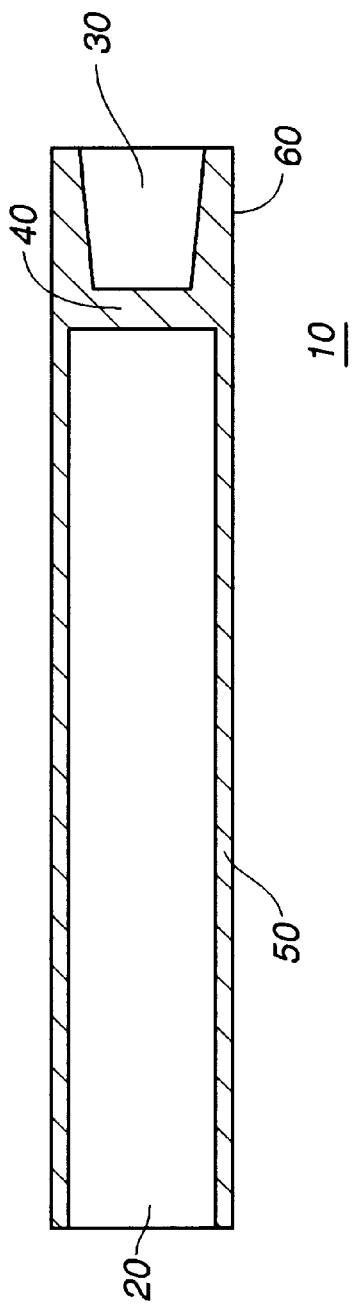
FIG. 1 is a cut-away view of the battery housing of the present invention.

The present invention is a battery housing with a battery compartment, an internal wall, and a latching compartment in which the housing has been formed by impact extrusion. The impact extrusion to form the battery housing may be a combination of forward and backward extrusions, or dual-impact extrusion, which employs two punches hitting a slug at the same time.

Extrusion is a process of shaping metal into a continuous form by forcing it through a dye of appropriate shape. In forward extrusion, the metal is held in a container having an opening (dye) of the desired finished section at one end. The metal is forced through the dye under great pressure by a ram. In backward extrusion, the ram is hollow and contains the dye. The container has a closed end, and the pressure of the ram forces the metal in the opposite direction. The peak pressure which is exerted by the ram may be as low as 250 kg/cm$^2$ for soft metal such as lead, or as high 32,000 kg/cm$^2$ for alloy steels. The impact of the punch or mandrill, causes the metal to fill the dye cavity and to flow or squirt upward out of the dye around the punch. The process is called impact extrusion.

Extrusion can be performed either hot or cold, depending on the work, the type of metal, and the amount of strain to which the work is subjected during the formation. Metals typically extruded hot include aluminum, copper, magnesium, zinc, tin, and their alloys. These same metals are sometimes extruded cold. Steel alloys are usually extruded hot, although the softer, more ductile grades, are sometimes cold extruded, e.g., low-carbon steels and stainless steels). Aluminum is probably the most ideal metal for extrusion, hot and cold and many commercial aluminum products are made by this process.

Cold extrusion and warm extrusion are generally used to make discrete parts often in finished or near-finished form. The term "impact extrusion" is used to indicate high-speed cold extrusion. Some important advantages of cold extrusion include increased strength due to strain hardening, close tolerances, improved surface finish, absence of oxide layers, and high production rates. Cold extrusion at room temperature also eliminates the need for heating the starting billet. Other metals which are extruded cold include zirconium, titanium, molybdenum, beryllium, vanadium, and niobium. Stresses in the tooling are the limiting factor. The maximum stem pressure is normally about 1400 newtons per mm$^2$.

Impact extrusion, typically backward impact extrusion, has been used to produce thin-walled metal containers. Products made by backward impact extrusion include toothpaste tubes and battery cases. Toothpaste containers contain toothpaste, while the battery cases formed by backward impact extrusion contain battery cells. However, modern electronic devices often have high power requirements, which require frequent replacement of batteries. Users often require that the batteries be replaced easily and quickly. This requires that the user have ready access to the battery compartment of the device without having to open up the electronic device, or at least that only a small portion of the electronic device be opened. The battery housing itself then must be exposed to the outside environment.

In order for the battery housing to be exposed to the outside environment, for ready access by the user, there must be some way of protecting the battery cells from moisture from the outside, and some way of securely latching the battery housing to the electronic device. The thin-walled battery housings of the prior art produced by reverse impact extrusion could not securely latch to an electronic device: the walls were not sturdy enough. Furthermore, a complicated and unreliable scheme of gaskets or rain seals would have been required to prevent moisture from the outside from penetrating the battery housing. The present invention provides a thin-walled battery housing (for lightness of weight) and combines it with the durability needed to latch a battery housing to an electronic device, along with a rain-seal to protect the battery cells from moisture in the outside environment. FIG. 1 shows a cross-section of one embodiment of the battery housing of the present invention. As shown in FIG. 1, battery housing (10) has two compartments separated by an internal wall. Battery compartment (20) is separated by internal wall (40) from latching compartment (30). The thin battery compartment wall (50) can be contrasted with the thick latching compartment wall (60). The latching compartment (30) is exposed to the environment outside the portable electronic device, while battery compartment (20) is pushed in the interior of the electronic device (not shown). The thick latching walls (60) permit the secure mechanical connection between the battery housing (10) and the electronic device (not shown). Battery housing (10) may be produced by combination forward and backward extrusion, or dual impact extrusion. In one embodiment of the invention, housing (10) is made out of aluminum.

The internal wall (40) provides an impenetrable barrier to moisture migrating from the latching compartment (30) to the battery compartment (20).

Figure 2:
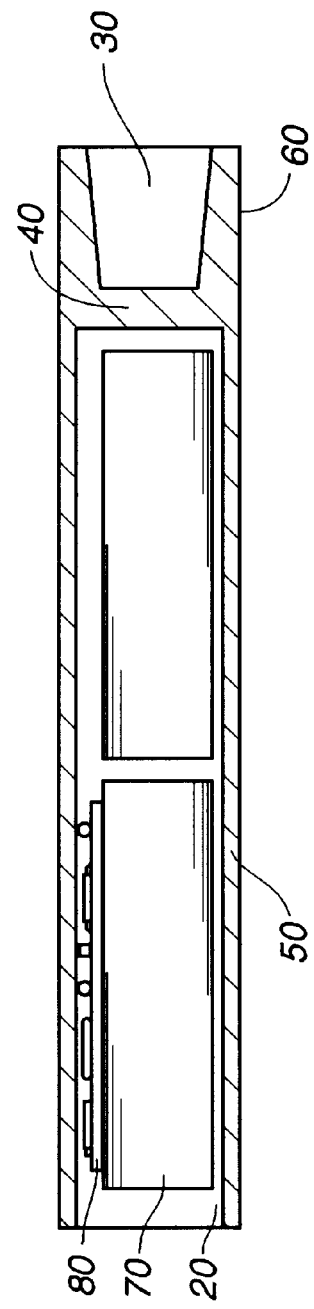
FIG. 2 is a cut-away view of the battery housing of the present invention, showing battery cells inserted in the battery housing.

FIG. 2 shows battery cells (70) with their associated circuitry (80) pushed into battery compartment (20) within battery housing (10). Since impact extrusion is a very precise process, battery housing (10) can be made to snugly fit battery cells (70). This permits the maximum size battery cell to be fitted into the battery housing (10) for a very efficient use of space within an electronic device.

Figure 3:
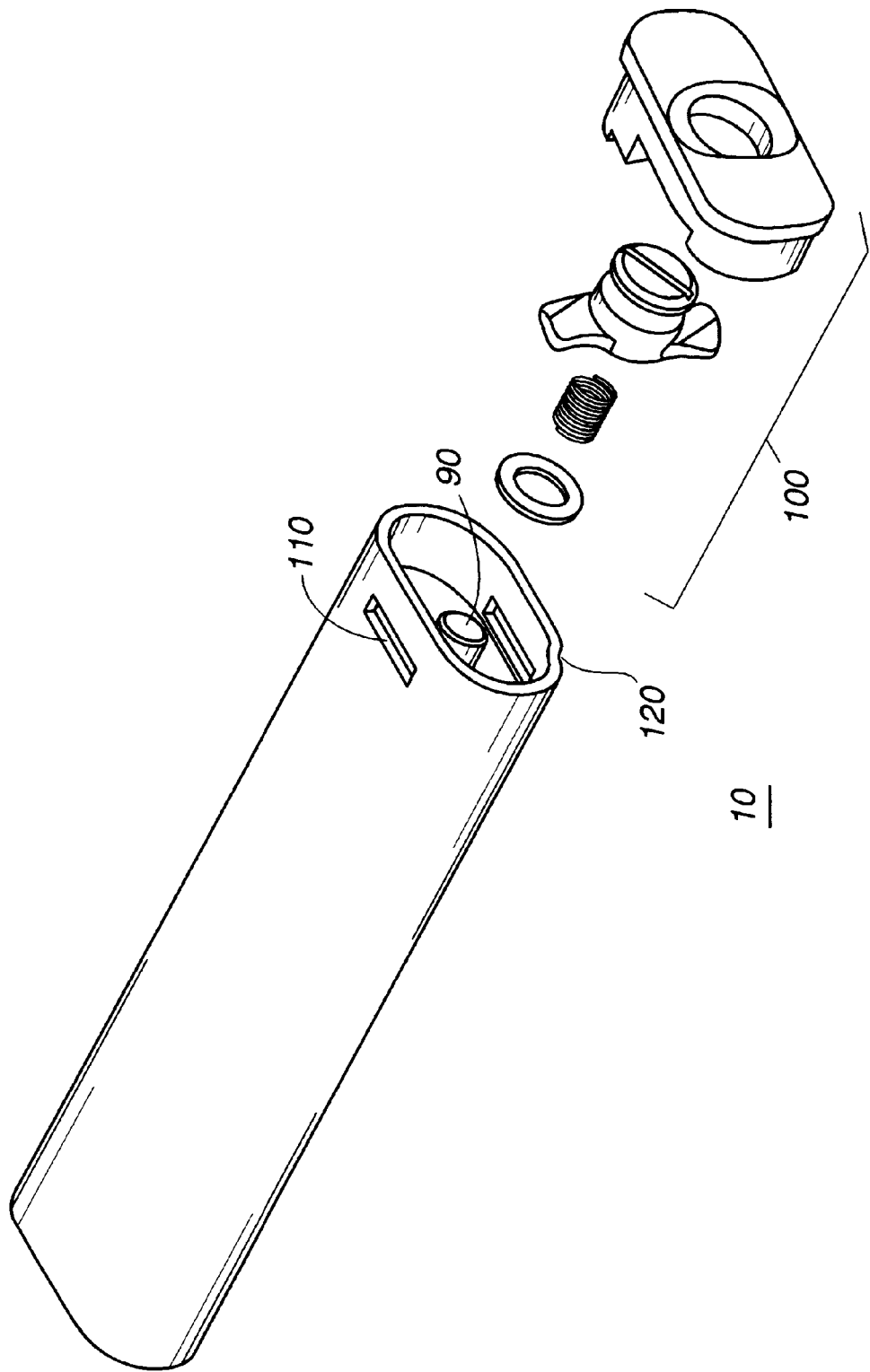
FIG. 3 is a perspective view of one embodiment of the battery housing of the present invention showing components which may be attached to the housing.

FIG. 3 shows another embodiment of the battery housing (10) of the present invention. In this embodiment, the thick latching compartment walls (60) have been machined to include apertures (110). The die (not shown) that produced the battery housing (10) was also designed to produce projection (90) and asymmetrical groove (120) which extends along the length of battery housing (10). Projection (90), in combination with machined apertures (110), allows the placement of latching mechanism (100) on battery housing (10). In this embodiment, latching mechanism (100) consists of a washer, a spring, a rotating lock and a snap-in housing. This latching mechanism allows the battery housing (10) to be secured latched to the electronic device it powers (not shown). Asymmetric groove (120) allows the user of the electronic device to place the battery in the correct orientation within the electronic device without much rumination on the subject. The battery housing (10) will only fit into the electronic device in one orientation.

In one embodiment of the invention, a cap can be placed over the end of the battery compartment (20) and then the aluminum can be crimped around the cap to seal the battery compartment. In one embodiment of the invention, the battery housing (10) was made out of aluminum, and the thin battery compartment was 0.7 mm thick, while the thick latching compartment wall (60) is 1.5 mm thick.

The present invention may be better understood with reference to the following example.

EXAMPLE

A battery housing for an portable electronic device was constructed in accordance with the present invention. Combination forward and reverse extrusion is used to produce a battery housing from aluminum a tube-shape that is elliptical. The tube was 150 mm long, the major axis had a diameter of 39 mm, and the minor axis had a diameter of 22 mm. The latching compartment had walls 1.9 mm thick, while the battery compartment had walls 0.7 mm thick. The wall between the two compartments was 1.0 mm thick.

The battery compartment was 142 mm long, and included a lengthwise groove. The latching compartment included apertures for placing a latch on the battery housing.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A battery housing comprising a battery compartment and a latching compartment separated by an internal wall, where the battery housing is made out of metal and formed by impact extrusion and wherein the battery compartment, latching compartment, and internal wall are all formed from the same piece of metal.

2. The battery housing of claim 1, where the impact extrusion is selected from the group consisting of combination extrusion and dual-impact extrusion.

3. The battery housing of claim 1 where the battery housing is made from metal selected from the group consisting of aluminum, copper, magnesium, zinc, tin, copper, zirconium, titanium, molybdenum, niobium, beryllium, vanadium, steel, and their alloys.

4. An electronic device comprising the battery housing of claim 1.

5. The battery housing of claim 1 further comprising a latching mechanism to latch the battery housing to an electronic device.

6. A battery pack comprising the battery housing of claim 1 further comprising battery cells inserted into the battery cell compartment.

* * * * *